United States Patent
Meltzer et al.

(10) Patent No.: US 8,273,845 B2
(45) Date of Patent: Sep. 25, 2012

(54) SOFT THERMOPLASTIC ELASTOMER COMPOSITION

(75) Inventors: Donald A. Meltzer, Akron, OH (US); Gilbert T. Montague, Independence, OH (US); Patrick E. Mosier, Bay Village, OH (US); Jacques P. E. J. Horrion, Tilff (BE)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 249 days.

(21) Appl. No.: 12/542,012

(22) Filed: Aug. 17, 2009

(65) Prior Publication Data

US 2010/0056682 A1 Mar. 4, 2010

Related U.S. Application Data

(60) Provisional application No. 61/093,568, filed on Sep. 2, 2008.

(51) Int. Cl.
*C08G 18/32* (2006.01)
*C08K 5/10* (2006.01)

(52) U.S. Cl. ........ 528/74.5; 524/319; 524/318; 524/590

(58) Field of Classification Search .................. 524/315, 524/318, 590; 528/74.5
See application file for complete search history.

(56) References Cited

U.S. PATENT DOCUMENTS

| | | | |
|---|---|---|---|
| 3,051,687 A * | 8/1962 | Young et al. | 525/418 |
| 3,393,173 A * | 7/1968 | Berry, Jr. | 523/451 |
| 3,706,687 A * | 12/1972 | Rudzki | 521/118 |
| 3,748,291 A * | 7/1973 | Bhakuni et al. | 523/402 |
| 4,223,112 A | 9/1980 | Hedrick et al. | |
| 4,230,838 A | 10/1980 | Foy et al. | |
| 4,332,920 A | 6/1982 | Foy et al. | |
| 5,959,059 A * | 9/1999 | Vedula et al. | 528/76 |
| 6,605,666 B1 * | 8/2003 | Scholz et al. | 524/591 |
| 2002/0001440 A1 * | 1/2002 | Bourget et al. | 385/100 |
| 2009/0192262 A1 * | 7/2009 | Meltzer et al. | 524/590 |

OTHER PUBLICATIONS

Product Information of Desmopan by Bayer, On-line Publication, 2011.*
Technical Information of TERATHAN PTMEG by Invista, On-line Publication, 2009.*

* cited by examiner

*Primary Examiner* — Tae H Yoon
(74) *Attorney, Agent, or Firm* — Thoburn T. Dunlap

(57) ABSTRACT

The present invention relates to a soft, semicrystalline, thermoplastic elastomer composition which is comprised of (I) a hydrophobic thermoplastic block copolymer which is comprised of (I) the reaction product of (1) a hydrophobic polyol or polyamine, (2) a polyisocyanate or an aromatic dicarboxylic acid, and (3) a chain extender containing 2 to 20 carbon atoms, or the reaction product of (1) a hydrophobic polyol or polyamine, and (2) a carboxyl terminated telechelic polyamide sequence; wherein the hydrophobic polyol or polyamine has a number average molecular weight in the range of from 1,000 to 4,000 Daltons; wherein the hydrophobic thermoplastic block copolymer has a weight average molecular weight in the range of 50,000 to 1,000,000 Daltons; and (II) from 1 to 80 weight percent of a mineral oil, wherein the soft, semicrystalline, thermoplastic elastomer composition has a Shore A hardness which is within the range of 20 to 80.

17 Claims, No Drawings

SOFT THERMOPLASTIC ELASTOMER COMPOSITION

RELATED APPLICATION

This application claims priority from U.S. Provisional Application Ser. No. 61/093,568 filed on Sep. 2, 2008.

FIELD OF THE INVENTION

The present invention relates to soft, hydrophobic, semicrystalline, thermoplastic polyurethane compositions containing mineral oil that have a Shore A hardness which is within the range of 20 to 80. These polyurethane compositions often have a Shore A hardness which is within the range of 40 to 70. They also typically have an uncharacteristically low specific gravity, i.e., less than 1.0 or even less than 0.97. This hydrophobic thermoplastic polyurethane composition offers a unique array of characteristics that are highly desirable for utilization in manufacturing a variety of products. For instance, it can be used in overmolding soft grips onto consumer products and in protective coatings.

BACKGROUND OF THE INVENTION

TPU (thermoplastic polyurethane) polymers are typically made by reacting (1) a hydroxyl terminated polyether or hydoroxyl terminated polyester, (2) a chain extender, and (3) an isocyanate compound. Various types of compounds for each of the three reactants are disclosed in the literature. The TPU polymers made from these three reactants find use in various fields where products are made by melt processing the TPU and forming it into various shapes to produce desired articles by processes such as extrusion and molding. Important uses for TPU include manufacturing shoe soles, hoses, cable jacketing, coated fabrics such as conveyor belts, sewer liners and printing blankets, protective coatings, adhesives, and melt spun elastic fibers.

TPUs are segmented polymers having soft segments and hard segments. This feature accounts for their excellent elastic properties. The soft segments are derived from the hydroxyl terminated polyether or polyester and the hard segments are derived from the isocyanate and the chain extender. The chain extender is typically one of a variety of glycols, such as 1,4-butane glycol.

U.S. Pat. No. 5,959,059 discloses a TPU made from a hydroxyl terminated polyether, a glycol chain extender, and a diisocyanate. This TPU is described as being useful for making fibers, golf ball cores, recreational wheels, and other uses.

In numerous applications, it would be desirable for the TPU to exhibit low hardness. In many of these applications, it would also be desirable for the TPU to be hydrophobic and to exhibit a low level of tensile set coupled with low specific gravity. The low specific gravity can be achieved via swelling the TPU in mineral oil. However, TPUs made with traditional polyols such as poly(butylene adiapte) (PBAd), poly(ethylene oxide) (PEO) and poly(tetramethylene oxide) (PTMEG) typically will only absorb less than a few percent of mineral oils rendering soft TPUs having the desired combinations of physical characteristics elusive.

Plastic handles of various shapes and sizes are found on many household items. Such household items include toothbrushes, shaving razors, hairbrushes, pens, tools, kitchen appliances and kitchen utensils. These household items have a variety of functions, but in most cases, it is desirable for the user to grip the handle of these items firmly, so that it does not fall out of the user's hand. In other cases, such as with a knife, it is desirable for the handle to be gripped with even more firmness so that leverage can be applied.

Because the handles of household items are normally made with a hard plastic, the simplest tasks can become problematic for some people, such as the elderly and those suffering from arthritis in the joints of their hands. This problem is compounded in cases where the handle of the article, such as a toothbrush or shaving razor, come into contact with water making it more slippery. For instance, when a toothbrush or razor is wet, it is more difficult to grip and can slip out of the user's hands. Other items such as tools and kitchen utensils can have handles that are difficult to hold or uncomfortable to grip because of the hardness of the plastic material. For persons suffering from arthritis, carpal tunnel syndrome or other hand injuries or infirmities, using basic household objects can become difficult or even impossible.

Most people would prefer to hold objects with a softer handle that is more soothing to the touch and easier to grip. Accordingly, a need exists for soft grip handles that can be grasped firmly and comfortably and which requires minimum strength and dexterity to grip and maneuver. There is, accordingly, a growing demand for a wide variety of articles that are soft and soothing to touch. It is, of course, also important for these articles to have the strength, durability, and rigidity needed in the applications where the article is used. This can be accomplished by overmolding a soft thermoplastic composition onto a hard thermoplastic substrate. However, there is a need for a soft thermoplastic elastomer composition that can be overmolded onto a hard thermoplastic resin substrate wherein the soft thermoplastic composition has lower hardness and low compression set. There is currently a need for a thermoplastic composition that has superior feel and comfort as characterized by a lower modulus to that which is obtained by using syndiotactic polypropylene copolymer, for example.

SUMMARY OF THE INVENTION

The soft, hydrophobic, semicrystalline, thermoplastic elastomer compositions of this invention offer a unique array of chemical and physical characteristics that are highly desirable for a variety of applications in manufacturing consumer and industrial products. These compositions are hydrophobic and typically have a Shore A hardness which is within the range of about 20 to about 80 coupled with a low specific gravity of less than about 1.0 g/m$^3$. In some cases, the elastomeric compositions of this invention have a specific gravity of less than 0.97 g/cm$^3$. They also normally offer low tensile set. The soft, hydrophobic, semicrystalline, thermoplastic elastomer of this invention also typically exhibits a glass transition temperature of less than about 0° C. This unique combination of properties makes the soft, hydrophobic, semicrystalline, thermoplastic elastomer composition of this invention beneficial for utilization in manufacturing adhesives, protective coatings, printing blankets, and overmolded grips for various consumer products.

The present invention more specifically discloses a soft, semicrystalline, thermoplastic elastomer composition which is comprised of (I) a hydrophobic thermoplastic block copolymer which is comprised of (I) the reaction product of (1) one or more hydrophobic polyols or polyamines, (2) a polyisocyanate or an aromatic dicarboxylic acid, and (3) one or more chain extenders containing 2 to 20 carbon atoms, or the reaction product of (1) at least one hydrophobic polyol or polyamine, and (2) a carboxyl terminated telechelic polyamide sequence; wherein the hydrophobic polyol or polyamine has a number average molecular weight which is within the range of about 1,000 to about 4,000 Daltons;

wherein the hydrophobic thermoplastic block copolymer has a weight average molecular weight which in with in the range of 50,000 to 1,000,000 Daltons; and wherein the hydrophobic thermoplastic block copolymer has a melting point which is more than about 90° C., and (II) from 1 weight percent to about 80 weight percent of a mineral oil.

The present invention also discloses an article of manufacture that is comprised of a soft, semicrystalline, thermoplastic elastomer composition overmolded onto a hard substrate wherein the soft, semicrystalline, thermoplastic elastomer composition is comprised of (I) a hydrophobic thermoplastic block copolymer which is comprised of the reaction product of (1) at least one hydrophobic polyol or polyamine, (2) a polyisocyanate or an aromatic dicarboxylic acid, and (3) at least one chain extender containing 2 to 20 carbon atoms, or the reaction product of (1) at least one hydrophobic polyol or polyamine, and (2) a carboxyl terminated telechelic polyamide sequence; wherein the hydrophobic polyol or polyamine has a number average molecular weight which is within the range of about 1,000 to about 4,000 Daltons; wherein the hydrophobic thermoplastic block copolymer has a weight average molecular weight which is within the range of 50,000 to 1,000,000 Daltons; and (II) a from 1 weight percent to about 80 weight percent of a mineral oil.

DETAILED DESCRIPTION OF THE INVENTION

The hydrophobic thermoplastic block copolymer used in the compositions of this invention can be a polyurethane (TPU), a copolyester (COPE), a copolyamide (COPA), or a polyurethaneurea (TPUU). The thermoplastic polyurethane (TPU) that can be used in the practice of this invention is comprised of the reaction product of (1) at least one hydrophobic polyol, (2) a polyisocyanate, and (3) at least one chain extender containing 2 to 20 carbon atoms; wherein the hydrophobic polyol has a number average molecular weight which is within the range of about 1,000 to about 4,000 Daltons; wherein the TPU has a weight average molecular weight which is within the range of 50,000 to 1,000,000 Daltons and a melting point is more than about 90° C.

The copolyamides (COPA polymers) that can be used in the practice of this invention can be the reaction product of a dicarboxylic polyamide with a hydrophobic polyol. These block copolymers have repeat units of the structural formula:

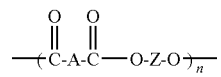

wherein A represents a polyamide sequence and Z represents the residue from a linear or branched hydrophobic polyol. COPA polymers of this type and techniques for their synthesis are described in greater detail in U.S. Pat. Nos. 4,220,838 and 4,332,920. The teachings of U.S. Pat. Nos. 4,220,838 and 4,332,920 are incorporated herein by reference for the purpose of illustrating COPA polymers that can be used in the practice of this invention and techniques for their synthesis. COPA polymers that are made by reacting a lactam, a polyol, and a polyacyl lactam are described by U.S. Pat. No. 4,223,112. The teachings of U.S. Pat. No. 4,223,112 are incorporated herein by reference for the purpose of illustrating this type of COPA polymer that can be used in the practice of this invention and techniques for its synthesis.

The thermoplastic polyurethaneurea (TPUU) used in the practice of this invention is comprised of the reaction product of (1) a hydrophobic polyamine, (2) a polyisocyanate, and (3) a chain extender containing 2 to 20 carbon atoms; wherein the hydrophobic polyol has a number average molecular weight which is within the range of about 1,000 to about 4,000 Daltons; wherein the TPUU has a weight average molecular weight which is within the range of 50,000 to 1,000,000 Daltons and a melting point which is more than about 100° C. The thermoplastic copolyester (COPE) utilized in the practice of this invention is comprised of the reaction product of (1) at least one hydrophobic polyol, (2) an aromatic diacid, and (3) at least one chain extender containing 2 to 20 carbon atoms; wherein the hydrophobic polyol has a number average molecular weight which is within the range of about 1,000 to about 4,000 Daltons; wherein the COPE has a weight average molecular weight which is within the range of 50,000 to 1,000,000 Daltons.

The hydrophobic thermoplastic block copolymer utilized in manufacturing the compositions of this invention is typically the reaction product of (1) at least one hydrophobic polyol, (2) polyisocyanate or an aromatic dicarboxylic acid, and (3) at least one chain extender containing 2 to 20 carbon atoms. The technique under which these reactants are polymerized to synthesize the thermoplastic polymer is conducted utilizing conventional equipment, catalysts, and procedures. However, the polymerization is conducted in a manner that will result in attaining a weight average molecular weight which is within the range of about 50,000 to about 1,000,000 Daltons. It is also, of course, conducted utilizing at least one hydrophobic polyol and at least one chain extender containing 2 to 20 carbon atoms, except for COPA in which case the at least one hydrophobic polyol is reacted with the carboxyl terminated telechelic polyamide sequence. The chain extender will typically be a linear chain extender that contains from 2 to 12 carbon atoms.

The hydrophobic polyol used in synthesizing the hydrophobic thermoplastic block copolymers used in the practice of this invention, such as TPUs, can be a diol of a conjugated diolefin monomer, a polyisobutylene diol, a polyester polyol prepared from fatty diols and/or fatty diacids, or mixtures thereof. For instance, diols of conjugated olefin monomers that can be used include hydrogenated polybutadienediols, and hydrogenated polyisoprene diol. Hydrogenated polybutadiene polyols are sold by Mitsubishi Chemical Corporation under the trade name POLYTAIL and Kraton polyols sold by Kiaton Polymers of Houston, Tex.

Diacid polyester polyols containing from about 8 to about 44 carbon atoms are well suited for utilization as the hydrophobic polyol in the practice of this invention. Fatty diacids (and esters thereof) are a well known commercially available class of dicarboxylic acids (or esters). They can, for example, be prepared by dimerising unsaturated long chain aliphatic monocarboxylic acids, usually of 13 to 22 carbon atoms, or their esters (alkyl esters). Said dimer acid will usually contain 26 to 44 carbon atoms. Particularly, examples include dimer acids (or esters) derived from $C_{18}$ and $C_{22}$ unsaturated monocarboxylic acids (or esters) which will yield, respectively, $C_{36}$ and $C_{44}$ dimer acids (or esters). Dimer acids derived from $C_{18}$ unsaturated acids, which include acids such as linoleic and linolenic are particularly well known (yielding $C_{36}$ dimer acids). For example DELTA 9, 11 and DELTA 9, 12 linoleic acids can dimerise to a cyclic unsaturated structure (although this is only one possible structure; other structures, including acyclic structures are also possible).

The dimer acid products will normally also contain proportions of trimer acids ($C_{54}$ acids when using $C_{18}$ starting acids), possibly even higher oligomers and also small amounts of the monomer acids. Several different grades of dimer acids are available from commercial sources and these differ from each other primarily in the amount of monobasic and trimer acid fractions and the degree of unsaturation. Priplast™ polyester polyols are branched $C_{36}$ dimerized fatty acids which are particularly useful as the hydrophobic polyol in the practice of this invention. Priplast™ polyester polyols are commercially available from Croda Uniqemna Inc. of Gouda, The Netherlands. The hydrophobic polyol used in synthesizing the TPU of this invention will typically have a number average molecular weight which is within the range of about 1,500 to about 4,000 Daltons and will preferably have a number average molecular weight which is within the range of about 2,000 to about 3,000 Daltons.

The hydrophobic polyols used in synthesizing TPUU and COPA polymers that can be employed in the practice of this invention are typically straight chained or branched diamines of the structural formula: $H_2N-(C_mH_{2m})-NH_2$, wherein m is an integer that represents the number of carbon atoms in the hydrophobic polyol. These hydrophobic polyols can be a diamine terminated ethylene-propylene copolymer rubber, a diamine terminated hydrogenated diene rubber, such as hydrogenated polyisoprene or hydrogenated polybutadiene, or the like, or mixtures thereof.

The chain extender that can be used in synthesizing the hydrophobic thermoplastic block copolymer include organic diols or glycols having from 2 to about 20 carbon atoms, such as alkane diols (straight chained and branched), cycloaliphatic diols, alkylaryl diols, and the like. Alkane diols which have a total from about 2 to about 12 carbon atoms are often utilized. Some representative examples of alkane diols that can be used include ethanediol, propane glycol, 1,6-hexanediol, 1,3-butanediol (1,3-BDO), 1,5-pentanediol, neopentylglycol (NPG), 2-butyl-2-ethyl-1,3-propanediol, 2,4-diethyl-1,5-pentanediol, 3-methyl-1,5-pentanediol, and 1,4-butanediol. Dialkylene ether glycols, such as diethylene glycol and dipropylene glycol, can also be used as the chain extender. Examples of suitable cycloaliphatic diols include 1,2-cyclopentanediol, 1,4-cyclohexanedimethanol (CHDM) and the like. Examples of suitable alkylaryl diols include hydroquinone di(β-hydroxyethyl)ether (HQEE), 1,4-benzenedimethanol, bisethoxy biphenol, bisphenol A ethoxylates, bisphenol F ethoxylates and the like. Still other suitable chain extenders are 1,3-di(2-hydroxyethyl)benzene, and 1,2-di(2-hydroxyethoxy)benzene. Mixtures of the above noted chain extenders can also be utilized.

Chain extenders with a functionality of greater than 2 may also be used with the proviso that the resulting polymer retains its thermoplastic nature and other desired chemical and physical characteristics. Examples of such chain extenders with a functionality greater than 2 include trimethylolpropane, glycerin, and pentaerythritol. Normally, chain extenders with a functionality greater than 2 are used in conjunction with difunctional chain extenders to limit the degree of resulting chain branching. Accordingly, the level of chain extenders with a functionality greater than 2 typically does not exceed 10 mole percent of the total amount of chain extenders used in making the thermoplastic polymer. In other words, difunctional chain extenders will typically represent at least about 90 mole percent of the total amount of chain extenders used in synthesizing the polymer.

The linear chain extender are typically preferred for used in making the thermoplastic block copolymers (TBCs) of this invention and will typically be of the structural formula:

wherein n represents an integer from 2 to 20 and wherein n typically represents an integer from 2 to 12. Accordingly, the linear chain extender will typically be selected from the group consisting of ethylene glycol, 1,3-propane diol, 1,4-butane diol, 1,5-pentane diol, 1,6-hexane diol, 1,7-heptane diol, 1,8-octane diol, 1,9-nonane diol, 1,10-decane diol, 1,11-undecane diol, and 1,12-dodecane diol. However, it should be appreciated that various mixtures of diols can be utilized as the chain extender in the practice of this invention.

The polyisocyanate used in synthesizing the thermoplastic polymer is preferably a diisocyanate. While aliphatic diisocyanates can be utilized, aromatic diisocyanates are highly preferred. Moreover, the use of multifunctional isocyanate compounds, i.e., triisocyanates, etc., which cause crosslinking, are generally avoided and thus the amount used, if any, is generally less than 4 mole percent and preferably less than 2 mole percent based upon the total moles of all of the various isocyanates used. Suitable diisocyanates include aromatic diisocyanates such as: 4,4'-methylene bis-(phenyl isocyanate) (MDI); m-xylene diisocyanate (XDI), phenylene-1-4-diisocyanate, naphthalene-1,5-diisocyanate, diphenylmethane-3,3'-dimethoxy-4,4'-diisocyanate, and toluene diisocyanate (TDI); as well as aliphatic diisocyanates such as isophorone diisocyanate (IPDI), 1,4-cyclohexyl diisocyanate (CHDI), decane-1,10-diisocyanate, and dicyclohexylmethane-4,4'-diisocyanate. Dimers and trimers of the above diisocyanates may also be used as well as a blend of two or more diisocyanates may be used.

The polyisocyanate used in this invention may be in the form of a low molecular weight polymer or oligomer which is end capped with an isocyanate. For example, a hydroxyl terminated polyether or polyester intermediate may be reacted with an isocyanate-containing compound to create a low molecular weight polymer end capped with isocyanate. In the TPU art, such materials are normally referred to as pre-polymers. Such pre-polymers normally have a number average molecular weight (Mn) which is within the range of about 1000 to about 10,000 Daltons.

The mole ratio of the one or more diisocyanates is generally from about 0.95 to about 1.05, and preferably from about 0.98 to about 1.03 moles per mole of the total moles of the one or more hydrophobic polyols and the one or more chain extenders. The molar ratio of the chain extender to the polyol will typically be within the range of about 0.3:1 to 5:1 and will more typically be within the range of about 0.4:1 to 4:1. The molar ratio of the chain extender to the polyol will preferably be within the range of about 0.5:1 to 3:1 and will more preferably be within the range of about 0.5:1 to 2:1.

A wide variety of aromatic dicarboxylic acids can be utilized in synthesizing the hydrophobic thermoplastic block copolyesters used in accordance with this invention. The aromatic dicarboxylic acid will typically contain from 8 to 16 carbon atoms. Some representative examples of aromatic dicarboxylic acids that can be used include terephthalic acid, isophthalic acid, orthophthalic acid, 1,8-naphthalenedicarboxylic acid, 1,7-naphthalenedicarboxylic acid, 1,6-naphthalenedicarboxylic acid, 1,5-naphthalenedicarboxylic acid, 2,6-naphthalenedicarboxylic acid, 2,7-naphthalenedicarboxylic acid, 1,7-anthracenedicarboxylic acid, 2,6-anthracenedicarboxylic acid, 2,7-anthracenedicarboxylic acid, 2,6-phenalenedicarboxylic acid, 1,6-phenalenedicarboxylic acid, 1,7-phenalenedicarboxylic acid, 2,8-naphthalenedicarboxylic acid, 2,9-naphthalenedicarboxylic acid, 1,7-naphthalenedicarboxylic acid, 1,10-naphthalenedicarboxylic acid, 2,7-pyrenedicarboxylic acid, 2,6-pyrenedicarboxylic acid, and 2,8-pyrenedicarboxylic acid. The preferred aromatic dicarboxylic acids include terephthalic acid, isophthalic acid, and 2,6-naphthalenedicarboxylic acid with terephthalic acid typically being the most preferred.

The hydrophobic thermoplastic block copolymers used in manufacturing the products of this invention can be a polyurethane, a copolyester, a copolyamide or a polyurethaneurea. However, TPUs are typically used as the hydrophobic thermoplastic block copolymer. Hydrophobic thermoplastic block copolymers, such as TPUs, that are useful in making the articles of this invention can be synthesized utilizing the same techniques and equipment as are used in making conventional thermoplastic block copolymers. For instance, in synthesizing hydrophobic thermoplastic block copolymers that are suitable for use in the practice of this invention, the hydrophobic polyol, the diisocyanate, and the chain extender are generally added together and reacted in accordance with any conventional urethane reaction method. Preferably, the TPU forming components of the present invention are melt polymerized in a suitable mixer, such as an internal mixer (a Banbury mixer), or preferably an extruder. In the preferred process, the hydrophobic polyol is blended with the glycol chain extender and added to the extruder as a blend. The diisocyanate is added separately to the extruder. Suitable processing or polymerization starting temperatures of the diisocyanate is from about 100° C. to about 200° C., and preferably from about 100° C. to about 150° C. Suitable processing or polymerization starting temperatures of the blend of the hydrophobic polyol and the chain extender is from about 100° C. to about 220° C., and preferably from about 150° C. to 200° C. Suitable mixing times in order to enable the various components to react and from the TPU polymers of the present invention are generally from about 2 to about 10 minutes, and preferably from about 3 to about 5 minutes.

The preferred process to produce the TPU is the process referred to as the one-shot polymerization process. In the one-shot polymerization process which generally occurs in situ, a simultaneous reaction occurs between three components, that is the one or more hydrophobic polyol, the chain extender, and the diisocyanate. The reaction is generally initiated at a temperature of from about 90° C. to about 200° C. In as much as the reaction is exothermic, the reaction temperature generally increases to about 220° C. to 250° C. The TPU polymer will exit the reaction extruder and will typically be pelletized. The pellets of TPU are normally stored in a heated vessel to continue the reaction and to dry the TPU pellets.

It is often desirable to utilize catalysts such as stannous and other metal carboxylates as well as tertiary amines. Examples of metal carboxylates catalysts include stannous octoate, dibutyl tin dilaurate, phenyl mercuric propionate, lead octoate, iron acetylacetonate, magnesium acetylacetonate, and the like. Examples of tertiary amine catalysts include triethylene diaminie, and tile like. The amount of the one or more catalysts is low, generally from about 50 to about 100 parts by weight per million parts by weight of the end TPU polymer formed.

The weight average molecular weight (Mw) of the TPU polymer used in the practice of this invention will typically be in the range of about 50,000 to about 1,000,000 Daltons, preferably from about 100,000 to about 500,000 Daltons, and more preferably from about 120,000 to about 400,000 Daltons. The Mw of the TPU polymer is measured according to gel permeation chromatography (GPC) against polystyrene standards.

When a higher molecular weight TPU polymer is desired, it can be achieved by using a small amount of a cross linking agent having an average functionality greater than 2.0 to induce cross linking. The amount of cross linking agent used is preferably less than 2 mole percent of the total moles of chain extender, and more preferably less than 1 mole percent. A particularly desirable method to increase the molecular weight in the preferred TPU polymer is to replace less than 1 mole percent of the chain extender with trimethylol propane (TMP).

The cross linking is accomplished by adding a cross linking agent having an average functionality greater than 2.0 together with the hydrophobic polyol, the isocyanate compound, and chain extender in tie reaction mixture to manufacture the TPU polymer. The amount of cross linking agent used in the reaction mixture to make the TPU polymer will depend on the desired molecular weight and the effectiveness of the particular cross linking agent used. Usually, less than 2.0 equivalent percent, and preferably less than 1.0 equivalent percent, based on the total equivalents of hydroxyls from all sources (from the one or more chain extenders and one or more hydrophobic polyols) used in making the TPU polymer are used. Levels of cross linking agent greater than 2.0 equivalent percent, based on the total equivalents of hydroxyls would be difficult to melt process. Therefore, the level of cross linking agent used is from about 0.05 mole equivalent to about 2.0 equivalent percent based on the total equivalents of hydroxyls from all sources.

The cross linking agents can be any monomeric or oligomeric materials which have an average functionality of greater than 2.0 and have the ability to cross link the TPU polymer. Such materials are well known in the art of thermoset polymers. Preferred cross linking agents include trimethylol propane (TMP) and pentaerythritol. Trimethylol propane has been found to particularly be a desirable cross linking agent.

The TPUs utilized in the practice of this invention are typically the reaction product of (1) a hydrophobic polyol, (2) a polyisocyanate, and (3) a linear chain extender containing 2 to 12 carbon atoms. The technique under which these reactants are polymerized to synthesize the thermoplastic polyurethane is conducted utilizing conventional equipment, catalysts, and procedures. However, the polymerization is conducted in a manner that will result in attaining a weight average molecular weight which is within the range of about 50,000 to about 1,000,000 Daltons. It is also, of course, conducted utilizing a hydrophobic polyol and a linear chain extender containing 2 to 12 carbon atoms.

A mineral oil is added to the hydrophobic thermoplastic block copolymers to make the soft, semicrystalline, thermoplastic elastomer compositions of this invention. The hydrophobic thermoplastic block copolymer can also be mixed with various conventional additives or compounding agents, such as fillers, extenders, pigments, lubricants, UV absorbers, plasticizers and the like. Fillers that can be used include talc, silicates, clays, calcium carbonate, and the like. The level of conventional additives will depend on the final properties and cost of the desired end-use application, as is well known to those skilled in the art of compounding TPUs. The additives (including the mineral oil) can be added during the reaction used to form the hydrophobic thermoplastic block copolymer or can be added in a second compounding step. The mineral oil can conveniently be mixed with the polyol and then incorporated into the polymer as it is synthesized or added separately. The mineral oil does not preclude the reactions used in making the polyurethane from occurring. In the alternative, the mineral oil can be added in the preformed polymer utilizing conventional mixing and/or sorption techniques.

From about 1 weight percent to about 80 weight percent of the mineral oil will be incorporated into the elastomer compositions of this invention (based upon the total weight of the elastomer composition). Typically, from about 10 weight percent to about 70 weight percent of the mineral oil will be incorporated into the polyurethane composition. More typically, from about 15 weight percent to about 50 weight percent of the mineral oil will be incorporated into the elastomer composition. In many cases, from about 20 weight percent to about 45 weight percent of the mineral oil will be incorporated into the elastomer composition.

The mineral oil utilized in the practice of this invention can be any oil composition selected from any of the base oils in Groups I-V as specified in the American Petroleum Institute (API) Base Oil Interchangeability Guidelines. The five base oil groups are as follows:

| Base Oil Category | Sulfur (%) | | Saturates (%) | Viscosity Index |
|---|---|---|---|---|
| Group I | >0.03 | and/or | <90 | 80 to 120 |
| Group II | <0.03 | and | >90 | 80 to 120 |
| Group III | <0.03 | and | >90 | >120 |
| Group IV | All polyalphaolefins (PAOs) | | | |
| Group V | All others not included in Groups I, II, III or IV | | | |

Groups I, II and III are mineral oil base stocks. The oil of lubricating viscosity, then, can include natural or synthetic lubricating oils and mixtures thereof. Mixture of mineral oil and synthetic oils, particularly polyalphaolefin oils and polyester oils, are often used.

Natural oils include animal oils and vegetable oils (e.g. castor oil, lard oil and other vegetable acid esters) as well as mineral lubricating oils, such as liquid petroleum oils and solvent-treated or acid treated mineral lubricating oils of the paraffinic, naphthenic or mixed paraffinic-naphthenic types can be useful in the practice of this invention. Hydrotreated or hydrocracked oils are included within the scope of useful oils of lubricating viscosity. Alkyl esters of vegetable oils, such as methyl esters of vegetable oils, ethyl esters of vegetable oils, and mixtures thereof, can also be used as the mineral oil in the practice of this invention.

Oils of lubricating viscosity derived from coal or shale are also useful. Synthetic lubricating oils include hydrocarbon oils and halosubstituted hydrocarbon oils, such as polymerized and interpolymerized olefins and mixtures thereof, alkylbenzenes, polyphenyl, (e.g., biphenyls, terphenyls, and alkylated polyphenyls), alkylated diphenyl ethers and alkylated diphenyl sulfides and their derivatives, analogs and homologues thereof. Alkylene oxide polymers and interpolymers and derivatives thereof, and those where terminal hydroxyl groups have been modified by, for example, esterification or etherification, constitute other classes of known synthetic lubricating oils that can be used. Another suitable class of synthetic lubricating oils that can be used comprises the esters of dicarboxylic acids and those made from $C_5$ to $C_{12}$ monocarboxylic acids and polyols or polyol ethers.

Other synthetic lubricating oils include liquid esters of phosphorus-containing acids, polymeric tetrahydrofurans, silicon-based oils such as the poly-alkyl-, polyaryl-, polyalkoxy-, or polyaryloxy-siloxane oils, and silicate oils.

Hydrotreated naphthenic oils are also known and can be used. Synthetic oils may be used, such as those produced by Fischer-Tropsch reactions and typically may be hydroisomerised Fischer-Tropsch hydrocarbons or waxes. In one embodiment oils may be prepared by a Fischer-Tropsch gas-to-liquid synthetic procedure as well as other gas-to-liquid oils.

Unrefined, refined and rerefinied oils, either natural or synthetic (as well as mixtures of two or more of any of these) of the type disclosed hereinabove can be used in the compositions of the present invention. Unrefined oils are those obtained directly from a natural or synthetic source without further purification treatment. Refined oils are similar to the unrefined oils except they have been further treated in one or more purification steps to improve one or more properties. Rerefined oils are obtained by processes similar to those used to obtain refined oils applied to refined oils which have been already used in service. Such rerefined oils often are additionally processed by techniques directed to removal of spent additives and oil breakdown products.

The paraffinic mineral oils that can be used in the practice of this invention are typically a mixture of alkanes that are liquids at room temperature (about 20° C.). These paraffin oils are comprised primarily of compounds of the general formula: $C_nH_{2n+2}$ wherein n represents an integer from about 6 to about 20. However, relatively small amounts of alkanes having higher molecular weights (wherein n is greater than 20) can be present in the paraffinic mineral oil. These paraffinic mineral oils are sometimes referred to as liquid paraffins, nujol, adepsine oil, alboline, glymol, medicinal paraffin, saxol, or USP mineral oil. Paraffinic mineral oils typically have a density which is within the range of 0.75 g/cm³ to 0.88 g/cm³.

Naphthenic mineral oils can be contrasted to paraffinic mineral oils in that they typically contain from about 40 weight percent to about 100 weight percent cycloalkanes (naphthalenes) and from about 0 weight percent to about 60 weight percent paraffinic mineral oils. The low-temperature behavior of naphthenic oils is better than that of paraffinic oils, making them suitable for applications that require a low pour point. However, it should be noted that naphthenic mineral oils have different solvent properties than paraffinic mineral oils.

The mineral oil used in making the polyurethane compositions of this invention can be a paraffinic mineral oil. It can be void of cycloalkanes or it can be a mixture of a paraffinic mineral oil and a naphthenic mineral oil. Normally, the mineral oil will contain less than 20 weight percent cycloalkanes and will typically contain less than 10 weight percent cycloalkanes.

Thermoplastic elastomer compositions of this invention are particularly useful as overmolding compositions for utilization in making soft grips and handles for consumer products. In any case, the mineral oil acts to swell the TPU making it softer. The addition of the mineral oil also typically reduces the overall material cost of the TPU composition.

The thermoplastic elastomer compositions of this invention have a melting point which is typically greater than about 90° C. as measured by ASTM D-3417-99 using a differential scanning calorimeter (DSC). However, in the case of very soft polymers the Kofler method can be used to measure the melting point of the thermoplastic elastomer. They also typically have a Shore A hardness of less than 80. In many cases the thermoplastic elastomer compositions of this invention have a Shore A hardness of less than 70 or even less than 60.

These elastomeric compositions will normally have a Shore A hardness which is within the range of 20 to 80 and will generally have a Shore A hardness which is within the range of 30 to 70.

The mineral oil containing thermoplastic elastomer compositions of this invention offer excellent resistance against compression set and tensile set. For instance, the thermoplastic elastomer compositions of this invention typically offer a tensile set at 200% strain of less than 30%, preferably less than 20%, and most preferably less than 15% when tested at 23° C. and in accordance with ASTM D412. They also offer high tensile strengths of over 500 psi ($3.4 \times 10^6$ Pascals) and elongations to break of greater than 500%. The thermoplastic elastomers of this invention will preferable have a tensile strength of greater than 700 psi ($4.8 \times 10^6$ Pascals) and will most preferably exhibit a tensile strength of greater than 1000 psi ($6.9 \times 10^6$ Pascals).

Thermoplastic elastomer compositions of this invention have characteristics that make them particularly desirable for utilization in manufacturing overmolded consumer products. In other words, the thermoplastic elastomers of this invention can be overmolded onto a hard substrate, such as a plastic or metal surface, to produce a soft grip or handle. The thermoplastic elastomer compositions of this invention offers excellent touch characteristics and low cost in such overmolding applications. It is also essentially odor-free, scratch resistant and can be colored as desired. More specifically, the thermoplastic elastomer compositions of this invention offers a low cost, gentle to the touch material for easy to grip handles that can by easily overmolded onto a hard thermoplastic resin or metal substrates.

The thermoplastic elastomer compositions of this invention can be beneficially used in making grips or handles for articles of manufacture including, but not limited to, toothbrushes, shaving razors, hairbrushes, hairdryers, paintbrushes, pens, tools (saws, hammers, screwdrivers, wrenches, pliers), kitchen appliances (handles for refrigerator doors, ovens, dishwashers, bread warmers, trash compactors), kitchen utensils (spoons, forks, knives, spatulas, shish kabob skewers, vegetable peelers, can openers, bottle openers, corkscrews, whisks, basting brushes), vacuum cleaner handles, brooms, mops, rakes, shovels, scissors, sporting equipment (fishing poles, tennis rackets, firearms, and golf clubs), and dinghy brushes. The present invention more specifically discloses an article of manufacture that is comprised of the soft thermoplastic elastomer composition of this invention which is overmolded onto a hard substrate, such as a metal or thermoplastic resin.

This invention is illustrated by the following examples that are merely for the purpose of illustration and are not to be regarded as limiting the scope of the invention or the manner in which it can be practiced. Unless specifically indicated otherwise, parts and percentages are given by weight.

EXAMPLE 1-6

In this experiment a series of TPU polymers were synthesized using the same general procedure with different chain extenders. The procedure used involved heating a blend of hydrophobic polyol and chain extender, and diisocyanate separately to about 120° C. and then mixing the ingredients. The viscosity of the reaction mixture was observed to significantly increase in about 1 to 5 minutes at during which time the reaction vessel was emptied and the polymerize was allowed to slowly cool to room temperature. The chain extender employed and the ratio of chain extender to polyisocyanate used are reported in Table 1. Stannous octoate was used as a catalyst at a level of 50 ppm in each example. In this series of experiments mineral oil was mixed into the polyol used in making the polyurethane. The amount of mineral oil added is shown in Table 1 along with physical properties of the thermoplastic polymers made.

TABLE 1

| | ASTM Test | | Example | | | | | |
|---|---|---|---|---|---|---|---|---|
| | Method | Units | 1 | 2 | 3 | 4 | 5 | 6 |
| Priplast ™ 3197 | | Parts by wt. | 189.75 | 189.75 | 189.75 | 189.75 | 189.75 | 189.75 |
| 1,12-dodecanediol | | Parts by wt. | 10.25 | 10.25 | 10.25 | 10.25 | 10.25 | 10.25 |
| White Paraffin oil* (180-190 SV) | | Parts by wt. | 23.7 | 47.4 | 47.4 | 71.1 | 71.1 | 118.5 |
| MDI | | Parts by wt. | 37.61 | 37.23 | 37.61 | 37.23 | 37.61 | 37.61 |
| Hardness | D2240 | Shore A | 62 | 56 | 58 | 54 | 43 | 38 |
| Ultimate Tensile | D412 | psi | 1610 | 1300 | 1510 | 962 | 986 | 872 |
| Ultimate Elongation | D412 | % | 489 | 842 | 774 | 717 | 322 | 755 |
| Stress @ 50% | D412 | psi | 294 | 221 | 225 | 175 | 195 | 131 |
| Stress @ 100% | D412 | psi | 511 | 347 | 354 | 288 | 366 | 288 |
| Stress @ 300% | D412 | psi | 1130 | 553 | 600 | 497 | 0 | 410 |
| Graves Tear (die C) | D624 | lb/in | 228 | 187 | 179 | 165 | 169 | 120 |
| Trouser Tear | D470 | lb/in | 44 | 50 | 49 | 36 | 33 | 28 |
| Tensile Set (200%) | D412 | % | 10 | 9.8 | 10.7 | 10.7 | 11.2 | 10.8 |
| Taber Abrasion (H-18, 1000 g) | D3389 | mg | 48 | 263 | 174 | 377 | 227 | 480 |
| Tg (DSC, $2^{nd}$ heat)** | | ° C. | −40 | −50 | −45 | −51 | −51 | −39 |
| Tm (DSC, $2^{nd}$ heat)** | | ° C. | 111 | 112 | 112 | 113 | 109 | 111 |
| Tc (DSC)** | | ° C. | 46 | 49 | 49 | 51 | 48 | 51 |

*sold by VWR
**DSC were measured between −100° C. and 250° C. using heating and cooling rates of 10° C./min on a Perkin Elmer instrument

EXAMPLES 7-10

The general procedure used in Examples 1-6 was repeated in this series of experiments. Stannous octoate was again used as a catalyst at a level of 50 ppm in each example. The amount of mineral oil added is shown in Table 2 along with physical properties of the thermoplastic polymers made.

TABLE 2

| | ASTM Test Method | Units | Example 7 | Example 8 | Example 9 | Example 10 |
|---|---|---|---|---|---|---|
| Priplast ™ 3197 | | Parts by wt. | 190.00 | 185.00 | 178.00 | 170.00 |
| HQEE | | Parts by wt. | 10.00 | 15.00 | 22.00 | 30.00 |
| White Paraffin (80-90 SV)* | | Parts by wt. | 118.50 | 118.50 | 118.50 | 118.50 |
| MDI | | Parts by wt. | 37.58 | 43.25 | 51.18 | 60.25 |
| Ultimate Tensile | D412 | Psi | 561 | 660 | 655 | 675 |
| Ultimate Elongation | D412 | % | 471 | 305 | 307 | 196 |
| Stress @ 50% | D412 | Psi | 125 | 212 | 243 | 309 |
| Stress @ 100% | D412 | psi | 222 | 360 | 397 | 505 |
| Stress @ 300% | D412 | psi | 364 | | | |
| Hardness | D2240 | Shore A | 43 | 51 | 55 | 58 |
| Graves Tear (die C) | D624 | lb/in | 101 | 123 | 110 | 103 |
| Trouser Tear | D470 | lb/in | 23 | 31 | 28 | 26 |
| Specific Gravity | D792 | g/cm$^3$ | 0.936 | 0.944 | 0.948 | 0.972 |
| Tensile Set (200%) | D412 | % | 10 | 9.8 | 10.7 | 10.7 |
| Tg (DSC, 2$^{nd}$ heat)** | | °C. | −54 | −53 | −50 | −54 |
| Tm (DSC, 2$^{nd}$ heat)** | | °C. | 212 | 213 | 212 | 212 |
| Tc (DSC)** | | °C. | 96 | 95 | 96 | 99 |

*sold by VWR
**DSC were measured between −100° C. and 250° C. using heating and cooling rates of 10° C./min on a Perkin Elmer instrument

EXAMPLES 11-12

The general procedure used in Examples 1-6 was again repeated in this series of experiments. Stannous octoate was again used as a catalyst at a level of 50 ppm in each example. The amount of mineral oil added is shown in Table 3 along with physical properties of the thermoplastic polymers made.

TABLE 3

| | ASTM Test Method | Units | Example 11 | Example 12 |
|---|---|---|---|---|
| Priplast ™ 3197 | | Parts by wt. | 189.75 | 189.75 |
| 1,12-dodecanediol | | Parts by wt. | 10.25 | 10.25 |
| Hydrocal 38 mineral oil, viscosity = 1.3 cSt | | Part by wt. | 175 | — |
| Calsol 810 mineral oil, viscosity = 4 cSt | | Parts by wt. | — | 175 |
| MDI | | Parts by wt. | 37.61 | 43.61 |
| Ultimate Tensile | D412 | Psi | 720 | 673 |
| Ultimate Elongation | D412 | % | 625 | 512 |
| Stress @ 50% | D412 | Psi | 161 | 141 |
| Stress @ 100% | D412 | Psi | 251 | 231 |
| Stress @ 300% | D412 | Psi | 440 | 433 |
| Stress @ 400% | D412 | Psi | 522 | 524 |
| Stress @ 500% | D412 | Psi | 606 | — |
| Hardness | D2240 | Shore A | 52 | 42 |
| Graves Tear (die C) | D624 | lb/in | 124 | — |
| Trouser Tear | D470 | lb/in | 30 | 23 |
| Specific Gravity | D792 | g/cm$^3$ | 0.941 | 0.943 |
| Tg (DSC, 2$^{nd}$ heat)* | | °C. | −38.5 | −52 |
| Tm (DSC, 2$^{nd}$ heat)* | | °C. | 112 | 110 |
| Tc (DSC)* | | °C. | 43 | 48 |

*DSC were measured between −100° C. and 250° C. using heating and cooling rates of 10° C./min on a Perkin Elmer instrument The Hydrocal 38 mineral oil and the Calson 810 mineral oil were provided by Calumet Lubricants Co. Hydrocal 38 mineral oil has a SUS viscosity at 100° F. of 38.1, a SUS viscosity at 210° F. of 30.4, a viscosity index of 83, a COC flash point of 215° F., a ASTM color of 10.5, a API Gravity at 60° F. of 28.9, and an aniline point of 139° F. Calsol 810 mineral oil has a SUS viscosity at 100° F. of 58.1, a SUS viscosity at 210° F. of 34.0, a viscosity gravity constant of 0.866, a COC flash point of 295° F., a API Gravity at 60° F. of 26.9, and an aniline point of 161° F.

EXAMPLES 13-15

The general procedure used in Examples 1-6 was repeated in this series of experiments. Stannous octoate was again used as a catalyst at a level of 50 ppm in each example. The amount of mineral oil added is shown in Table 4 along with physical properties of the thermoplastic polymers made.

TABLE 4

| | ASTM Test Method | Units | Example 13 | Example 14 | Example 15 |
|---|---|---|---|---|---|
| Priplast ™ 3197 | | Parts by wt. | 189.75 | 189.75 | 189.75 |
| 1,12-dodecanediol | | Parts by wt. | 10.25 | 10.25 | 10.25 |
| Star 4 mineral oil, viscosity = 4.2 cSt** | | Parts by wt. | 120 | — | — |
| Star 8 mineral oil, viscosity = 7.7 cSt** | | Parts by wt. | — | 120 | — |
| Ultra S-4 mineral oil, viscosity = 4.2** | | Parts by wt. | — | — | 120 |
| MDI | | Parts by wt. | 37.61 | 37.61 | 37.61 |
| Ultimate Tensile | D412 | psi | 726 | 683 | 659 |
| Ultimate Elongation | D412 | % | 274 | 292 | 208 |
| Stress @ 50% | D412 | psi | 283 | 243 | 341 |
| Stress @ 100% | D412 | psi | 452 | 366 | 544 |
| Hardness | D2240 | Shore A | 46 | 48 | 45 |
| Graves Tear (die C) | D624 | lb/in | 111 | 130 | 94 |

TABLE 4-continued

| | ASTM Test | | Example | | |
|---|---|---|---|---|---|
| | Method | Units | 13 | 14 | 15 |
| Tg (DSC, 2$^{nd}$ heat)* | | °C. | −62 | −62 | −62 |
| Tm (DSC, 2$^{nd}$ heat)* | | °C. | 113 | 111 | 112 |
| Tc (DSC)* | | °C. | 51 | 49 | 50 |

*DSC were measured between −100° C. and 250° C. using heating and cooling rates of 10° C./min on a Perkin Elmer instrument
**The Star 4 and Star 8 mineral oils as well as the Ultra S-4 mineral oil were provided by Conoco-Phillips.

While certain representative embodiments and details have been shown for the purpose of illustrating the subject invention, it will be apparent to those skilled in this art that various changes and modifications can be made therein without departing from the scope of the subject invention.

What is claimed is:

1. A soft, semicrystalline, polyurethane thermoplastic elastomer composition which is comprised of (I) a hydrophobic thermoplastic block copolymer which is comprised of the reaction product of (1) at least one hydrophobic polyol, wherein said hydrophobic polyol is a diacid polyester polyol made with dimerised fatty acids and wherein said dimer fatty acid contains 36 carbon atoms, (2) a polyisocyanate, and (3) at least one chain extender containing 2 to 20 carbon atoms, wherein the hydrophobic polyol has a number average molecular weight which is within the range of about 1,000 to about 4,000 Daltons; wherein the hydrophobic thermoplastic block copolymer has a weight average molecular weight which is within the range of 50,000 to 1,000,000 Daltons; and (II) from 10 weight percent to about 80 weight percent of a mineral oil, wherein said elastomer composition has a specific gravity less than 1.0 g/cc$^3$ and a Shore A hardness of from 20 to 80.

2. A soft, semicrystalline, thermoplastic elastomer composition as specified in claim 1 wherein the polyisocyanate is a diisocyanate.

3. A soft, semicrystalline, thermoplastic elastomer composition as specified in claim 2 wherein the polyisocyanate is an aromatic diisocyanate.

4. A soft, semicrystalline, thermoplastic elastomer composition as specified in claim 3 wherein the aromatic diisocyanate is selected from the group consisting of 4,4'-methylene bis-(phenyl isocyanate), m-xylene diisocyanate, phenylene-1-4-diisocyanate, naphthalene-1,5-diisocyanate, diphenyl-methane-3,3'-dimethoxy-4,4'-diisocyanate, and toluene diisocyanate.

5. A soft, semicrystalline, thermoplastic elastomer composition as specified in claim 3 wherein the aromatic diisocyanate is 4,4'-methylene bis-(phenyl isocyanate).

6. A soft, semicrystalline, thermoplastic elastomer composition as specified in claim 1 wherein the hydrophobic polyol has a number average molecular weight which is within the range of about 2,000 to about 3,000 Daltons.

7. A soft, semicrystalline, thermoplastic elastomer composition as specified in claim 1 wherein the chain extender is 1,3-propanediol, 1,5-pentanediol, 1,12-dodecanediol, 1,4-butanediol, 1,6-hexanediol, or hydroquinone di (β-hydroxyethyl) ether, or mixtures thereof.

8. A soft, semicrystalline, thermoplastic elastomer composition as specified in claim 1 wherein the molar ratio of the chain extender to the diisocyanate is within the range of about 0.3:1 to 10:1.

9. A soft, semicrystalline, thermoplastic elastomer composition as specified in claim 1 wherein the molar ratio of the chain extender to the diisocyanate is within the range of about 0.5:1 to 3:1.

10. A soft, semicrystalline, thermoplastic elastomer composition as specified in claim 1 wherein the molar ratio of the chain extender to the diisocyanate is within the range of about 0.5:1 to 2:1.

11. A soft, semicrystalline, thermoplastic elastomer composition as specified in claim 1 wherein the semicrystalline, thermoplastic polyurethane has a melting point which is greater than 90° C. and has a glass transition temperature of less than 0° C.

12. A soft, semicrystalline, thermoplastic elastomer composition as specified in claim 1 wherein the mineral oil is present at a level which is within the range of about 10 weight percent to about 70 weight percent.

13. A soft, semicrystalline, thermoplastic elastomer composition as specified in claim 1 wherein the mineral oil contains less than 20 weight percent cycloalkanes.

14. A soft, semicrystalline, thermoplastic elastomer composition as specified in claim 1 wherein the mineral oil is a base oil from Group I, Group II, Group III, Group IV, or Group V as specified in the American Petroleum Institute Base Oil Interchangeability Guidelines.

15. A soft, semicrystalline, thermoplastic elastomer composition as specified in claim 1 wherein the mineral oil is a vegetable oil.

16. A soft, semicrystalline, thermoplastic elastomer composition as specified in claim 1 wherein the mineral oil is an alkyl ester of a vegetable oil.

17. An article of manufacture that is comprised of a soft, semicrystalline, polyurethane thermoplastic elastomer composition overmolded onto a hard substrate wherein the soft, semicrystalline, thermoplastic elastomer composition is comprised of (I) a hydrophobic thermoplastic block copolymer which is comprised of the reaction product of (1) at least one hydrophobic polyol, wherein said hydrophobic polyol is a diacid polyester polyol made with dimerised fatty acids and wherein said dimer fatty acid contains 36 carbon atoms, (2) a polyisocyanate, and (3) at least one chain extender containing 2 to 20 carbon atoms, wherein the hydrophobic polyol has a number average molecular weight which is within the range of about 1,000 to about 4,000 Daltons; wherein the hydrophobic thermoplastic block copolymer has a weight average molecular weight which is within the range of 50,000 to 1,000,000 Daltons; and (II) from 10 weight percent to about 80 weight percent of a mineral oil, and wherein said elastomer composition has a specific gravity less than 1.0 g/cc$^3$ and a Shore A hardness of from 20 to 80.

\* \* \* \* \*